United States Patent
Horslund et al.

(10) Patent No.: US 7,071,871 B2
(45) Date of Patent: Jul. 4, 2006

(54) LOW POWER DISSIPATION TRACKING ARCHITECTURE FOR GPS NAVIGATION SYSTEMS

(75) Inventors: Jeff M. Horslund, Tucson, AZ (US); Kenneth S. Barron, Plano, TX (US); Bernard J. Gil, Tucson, AZ (US); Christopher D. Collinvitti, Plano, TX (US)

(73) Assignee: Raytheon Company, Waltham, MA (US)

( * ) Notice: Subject to any disclaimer, the term of this patent is extended or adjusted under 35 U.S.C. 154(b) by 97 days.

(21) Appl. No.: 11/038,821

(22) Filed: Jan. 19, 2005

(65) Prior Publication Data
US 2005/0212699 A1    Sep. 29, 2005

Related U.S. Application Data

(60) Provisional application No. 60/556,175, filed on Mar. 25, 2004.

(51) Int. Cl.
*G01S 1/00* (2006.01)
(52) U.S. Cl. .............................. 342/357.06; 342/357.12
(58) Field of Classification Search ........... 342/357.06, 342/357.12, 374; 455/277.1, 276.1; 701/207, 701/213, 215
See application file for complete search history.

(56) References Cited

U.S. PATENT DOCUMENTS

| | | | |
|---|---|---|---|
| 4,392,611 A * | 7/1983 | Bachman et al. ............. 239/74 |
| 5,983,160 A | 11/1999 | Horslund et al. |
| 2002/0034973 A1* | 3/2002 | Avis ........................... 455/574 |
| 2004/0028149 A1* | 2/2004 | Krafft et al. ................. 375/316 |
| 2005/0083230 A1* | 4/2005 | Harvey et al. ......... 342/357.06 |

* cited by examiner

*Primary Examiner*—Dao Phan
(74) *Attorney, Agent, or Firm*—John E. Gunther; Leonard A. Alkov; Karl A. Vick

(57) ABSTRACT

A low power GPS tracking system. The novel system includes a first circuit adapted to collect samples of a signal for a first predetermined length of time and in accordance therewith generate an output signal, and a second circuit for cyclically powering on the first circuit for the first predetermined length of time and powering off the first circuit, or a portion thereof, for a second predetermined length of time. In an illustrative embodiment, the first circuit includes a receiver adapted to receive a GPS signal and output GPS data samples, and a processor adapted to calculate a navigation solution from the GPS data samples using an integrate and dump signal processing technique.

23 Claims, 4 Drawing Sheets

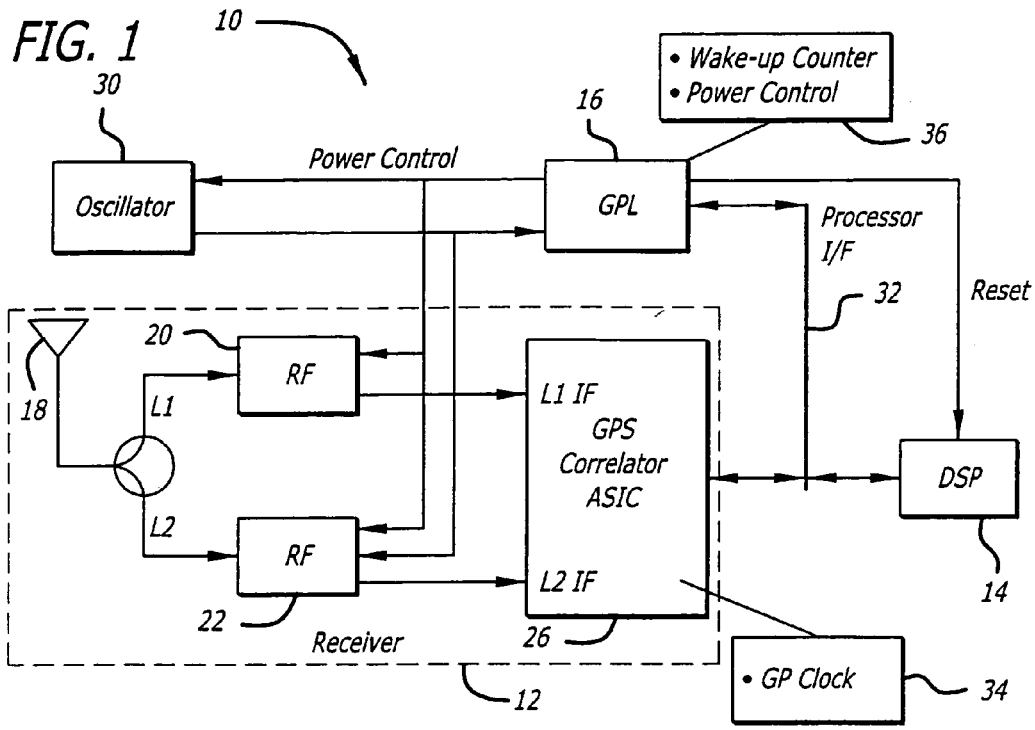
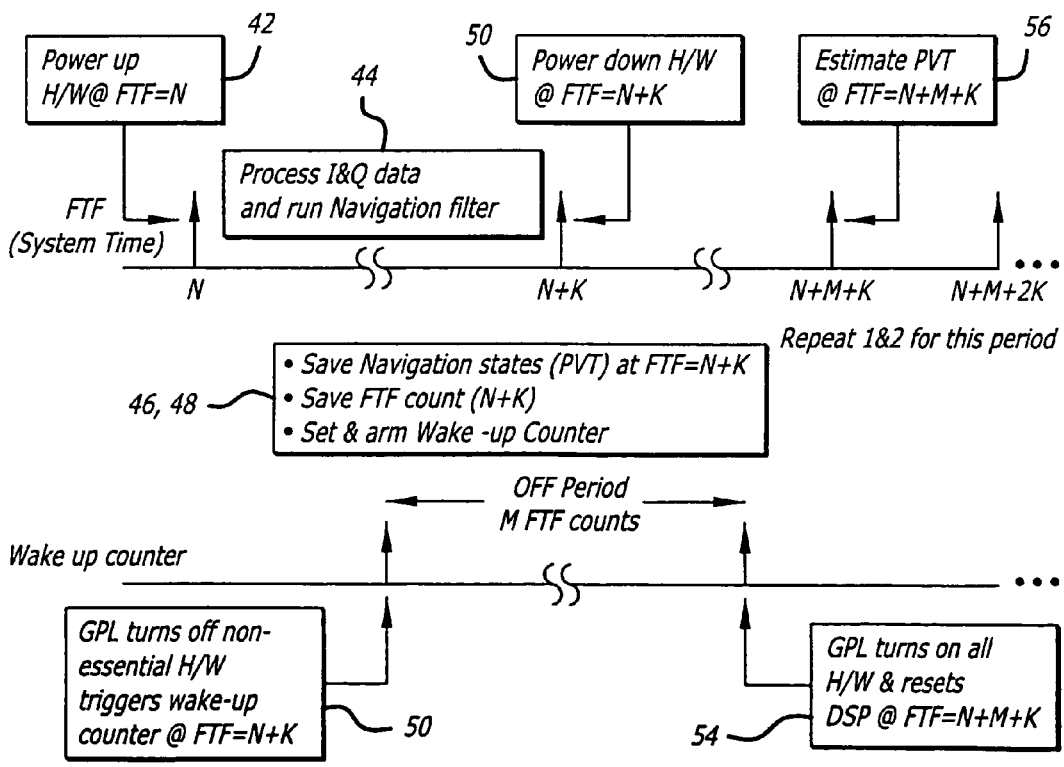

LOW POWER DISSIPATION TRACKING ARCHITECTURE FOR GPS NAVIGATION SYSTEMS

CROSS-REFERENCE TO RELATED APPLICATIONS

This application claims the benefit of U.S. Provisional Application No. 60/556,175, filed Mar. 25, 2004, the disclosure of which is hereby incorporated by reference.

BACKGROUND OF THE INVENTION

1. Field of the Invention

The present invention relates to electronics and electrical systems. More specifically, the present invention relates to systems utilizing GPS (Global Positioning System) signals.

2. Description of the Related Art

Many applications using GPS for navigational purposes, particularly handheld applications, require low power in order to preserve battery life. The primary components that dissipate large amounts of power are signal processing ASICs (application specific integrated circuits) including digital signal processors (DSPs) that are required to acquire and track the GPS signal. Many power requirements are difficult if not impossible to meet given the current state of semiconductor technology combined with requirements for steady navigation updates (i.e. updates required every second or two). The key dilemma is that hardware components need to be continually powered on in order to track and produce navigation updates at the required rate.

Prior attempts to solve the problem have focused on adding low power improvements to the hardware. With each new generation of DSP technology, shrinking semiconductor geometries result in processors with lower amounts of power dissipated when operating continuously. In addition, recent DSP innovations have produced low power "shutdown" modes that enable users to shut off clocks to the DSP core on a programmable basis, virtually shutting off the DSP in the process. Conventional tracking techniques, however, require continuous tracking of the GPS signal. These traditional tracking techniques fundamentally limit the amount that new DSP "shutdown" features can be utilized since continuous track is required.

Conventional GPS tracking systems utilize classical phase and delay lock loops that require a continuous stream of GPS signal samples in order to track the signal and form measurements that are input to the navigator. This standard tracking technology cannot be interrupted for periods of time without having to reacquire the signal and re-establish a steady state condition (which typically requires several seconds). Therefore, it is not possible to switch the signal processing hardware from on to off and back on without creating a performance degrading transient condition.

Hence, a need exists in the art for an improved GPS tracking system that offers lower power dissipation than conventional approaches.

SUMMARY OF THE INVENTION

The need in the art is addressed by the low power GPS tracking system of the present invention. The novel system includes a first circuit adapted to collect samples of a signal for a first predetermined length of time and in accordance therewith generate an output signal, and a second circuit for cyclically powering on the first circuit for the first predetermined length of time and powering off the first circuit, or a portion thereof, for a second predetermined length of time. In an illustrative embodiment, the first circuit includes a receiver adapted to receive a GPS signal and output GPS data samples, and a processor adapted to calculate a navigation solution from the GPS data samples using an integrate and dump technique.

BRIEF DESCRIPTION OF THE DRAWINGS

FIG. 1 is simplified block diagram of an illustrative embodiment of a GPS tracking system designed in accordance with the teachings of the present invention.

FIG. 3 is the corresponding timing diagram to the flow chart in FIG. 2, illustrating the timing and associated processing for one on/off cycle of an illustrative GPS tracking system designed in accordance with the teachings of the present invention.

DESCRIPTION OF THE INVENTION

Figure 2:
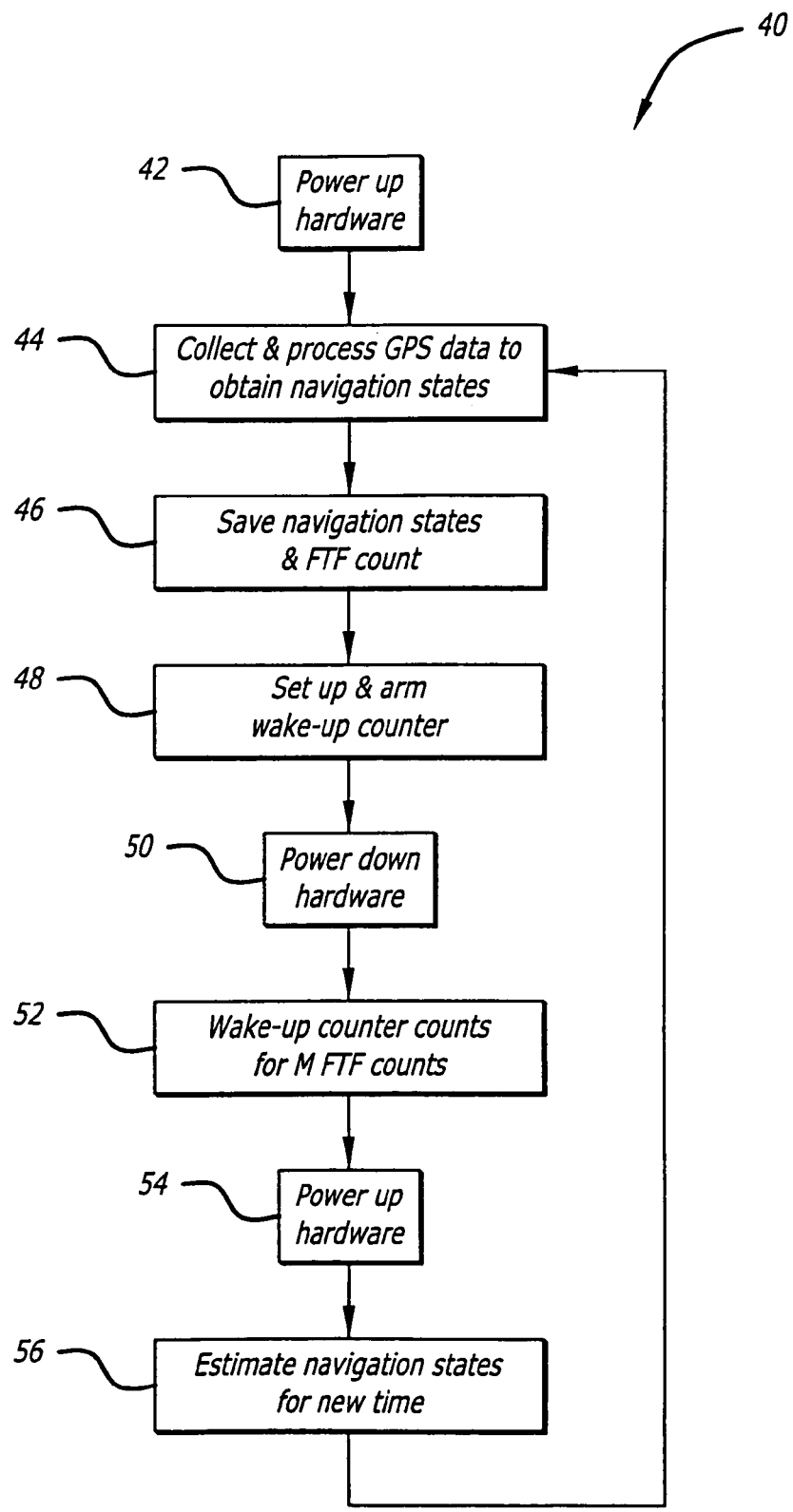
FIG. 2 is a flow chart of an illustrative embodiment of a low power GPS tracking method designed in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

U.S. Pat. No. 5,983,160, issued Nov. 9, 1999, to J. M. Horslund and J. R. Hooker and entitled "INCREASE JAMMING IMMUNITY BY OPTIMIZING PROCESSING GAIN FOR GPS/INS SYSTEMS", the teachings of which are incorporated herein by reference, disclosed a novel GPS signal tracking architecture called direct measurement processing (DMP), which forms measurement residuals without the use of classical tracking loops. The original DMP architecture was invented to improve navigation performance under jamming conditions. In accordance with the present teachings, the DMP tracking technique can be modified for low power applications to process only a small percentage of the overall available signal (i.e. for a small time interval) and then shut down power consuming signal processing components the remainder of the time.

The DMP tracking architecture was modified to take advantage of the fact that there is enough information in one 20 msec sample of a GPS signal to update the navigator every second and still meet navigation requirements for handheld applications. In contrast to classical GPS tracking systems, the DMP technique optimally weights residuals formed directly from GPS signal samples to drive the navigator without the use of tracking loops. A DMP system modified in accordance with the present invention results in a low power tracking mode that enables key hardware components to be switched on to collect and process a 20 ms sample, update the navigation solution, and subsequently switch off power consuming hardware once the sample has been processed. Nominal off times of 980 ms for a one second update rate can be attained, which theoretically implies that key hardware components need to be on only 2 percent of the time. Depending on jamming and dynamic conditions, different percentages of on/off times are a programmable feature of the architecture. This is in sharp contrast to the tracking architecture found in the prior art that requires a continuous stream of samples in order to function properly.

FIG. 1 is simplified block diagram of an illustrative embodiment of a GPS tracking system 10 designed in accordance with the teachings of the present invention. Note that this embodiment is primarily used to illustrate the concept, and clearly variations of the depicted architecture could also be used without departing from the scope of the present teachings.

The illustrative GPS tracking system 10 includes a receiver 12, a digital signal processor (DSP) 14, and a power control unit 16, which, in this embodiment, is implemented using a general-purpose programmable logic (GPL) circuit 16. The receiver 12 and DSP 14 are adapted to cyclically collect and process GPS samples for a first time period (nominally 20 ms) and then shut down for a second time period (nominally 980 ms). The power control unit 16 controls the powering on and off of the hardware. In the embodiment of FIG. 1, the receiver 12 includes an antenna 18 for receiving a GPS signal, which is typically comprised of two signals L1 and L2; dual RF front ends 20 and 22 adapted to receive the GPS signals L1 and L2, respectively, and output intermediate frequency (IF) samples L1 IF and L2 IF, respectively; and a GPS correlator ASIC 26, which receives the IF samples and produces baseband samples of the GPS data, which are subsequently input to the DSP 14. More specifically, the correlator ASIC 26 typically includes a plurality of GPS channels to enable tracking of a plurality of satellites simultaneously. Signals from a plurality of satellites are received and processed in the correlator ASIC 26 in parallel to produce and output in-phase (I) and quadrature (Q) samples (derived from the received GPS system signals) to the baseband processing software in the DSP 14. The illustrative tracking system 10 also includes an oscillator 30 from which system clock signals are derived, and a processor interface 32 for communication between the GPL 16, DSP 14, and GPS ASIC 26.

In the preferred embodiment, for the purposes of low power operation, each hardware component, or some part of each component (other than the control unit 16 and the oscillator 30), can be programmed to be powered off for a variable period of time to conserve power. In an illustrative embodiment, the GPS ASIC 26 is a 24-channel correlation ASIC referred to as the Enhanced Signal Processing chip (ESPC). Portions of the ESPC can be essentially powered off by inhibiting certain clock signals internal to the device. In particular, the ESPC can be programmed to power down individual channels or parts of channels to save power. The DSP 14 can be implemented using, for example, a Texas Instruments (TI) DSP (TMS32064x). This particular DSP has "low power modes" that allow portions of the device, including the central processing unit (CPU) core, to be effectively turned off. In the preferred embodiment, the dual RF front ends 20 and 22 are also implemented using devices that can be placed in power conserving modes.

In addition, in the preferred embodiment, general purpose clocks 34 (GP clocks) required to maintain system timing in conjunction with channel synchronization functionality are also included as part of the correlation ASIC 26. The period of the GP clock 34 responsible for keeping system time is referred to as a fundamental time frame (FTF) and represents the minimum time period during which GPS samples are collected (nominally 20 ms) at each clock epoch (i.e. rising edge).

In the preferred embodiment, the GPL 16 contains both power control logic and a "wake-up" counter 36 driven by a high bandwidth clock input that is derived from the reference oscillator 30. The wake-up counter 36 is used for time keeping during the power down cycle of the low power mode since, in the illustrative embodiment, the FTF counter is contained within the correlation ASIC 26, which is one of the components powered down during the off cycle. Note that the GPL 16 remains powered up at all times since keeping track of accurate time (to within approximately one nanosecond) when the correlation ASIC 26 is off is a key requirement for the low power mode to perform properly.

A functional description of the low power mode can be broken into two phases, a "powered on" phase when most processing occurs and a "powered off" phase when key processing components are powered off except those required for accurate time keeping and control functions, which, in the illustrative embodiment, are contained within the GPL 16. The next section describes in detail both the processing and timing during both the on and off phases of the low power track mode for the preferred embodiment.

FIG. 2 is a flow chart of an illustrative embodiment of a low power GPS tracking method 40 designed in accordance with the teachings of the present invention. FIG. 3 is a corresponding timing diagram, illustrating the timing and associated processing for one on/off cycle of the illustrative GPS tracking system designed in accordance with the teachings of the present invention.

At the start of the on/off cycle when the system clock is equal to N (FTF=N), the hardware components are powered on (Step 42). During this phase of the cycle, which terminates at FTF=N+K, both the I and Q samples derived from the GPS signal are collected and processed (by the receiver 12 and DSP 14 in the illustrative embodiment of FIG. 1) (Step 44). The variable K can take on different values depending primarily upon jamming conditions (K=1 for minimal power dissipation when there is no jamming). The processing culminates in the calculation of a corrected navigation solution that is valid at the last occurring FTF epoch prior to issuing a power down command (at FTF=N+K). In the preferred embodiment, the navigation solution includes the position (P), velocity vectors (V), and two clock or time states (T).

Once the navigation solution is updated and saved (Step 46), the wake up counter 36 is activated or "armed" (Step 48), and a power down command is issued that causes the appropriate hardware components to be powered down (Step 50) at FTF=N+K. Note that the wake-up counter 36 is located in the GPL 16 in the preferred embodiment and both the wake-up counter 36 and the oscillator 30 are powered on during the off part of the cycle. After the wake-up counter is armed, it begins counting down for M FTF counts (Step 52). In this way, the wake-up counter keeps track of the local system time, in the form of FTF counts, while all other hardware components are powered down.

Figure 4:
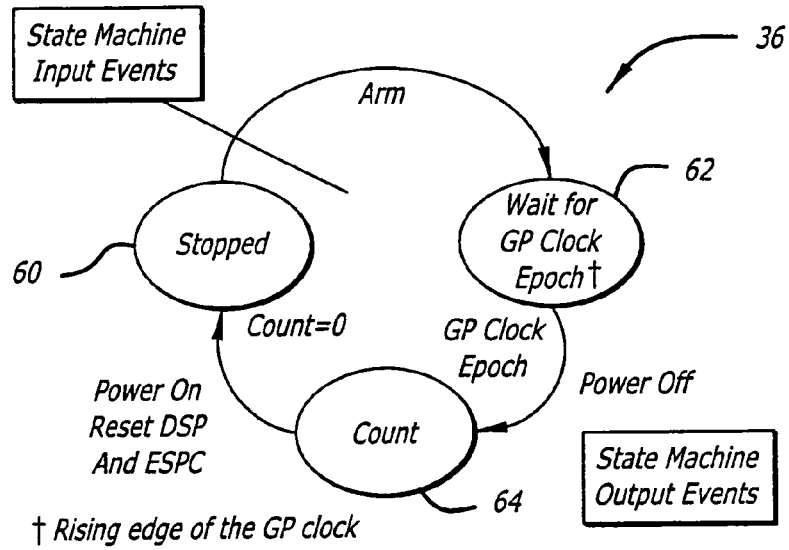
FIG. 4 is a state diagram for an illustrative wake-up counter designed in accordance with the teachings of the present invention.

FIG. 4 is a state diagram for an illustrative wake-up counter 36 designed in accordance with the teachings of the present invention. The wake-up counter 36 is initially in a "stopped" state 60. When the DSP 14 arms the wake-up counter (Step 48), the wake-up counter 36 transitions to a "wait" state 62, waiting for the next general purpose clock edge (FTF rising edge). On this edge, the wake-up counter transitions to a "count" state 64. All non-essential hardware components are effectively powered off and the wake-up counter 36 begins to count down from a programmed start value (M FTF counts). When the count reaches 0, the hardware is powered on: the RF components 20, 22 are powered on, the DSP 14 is reset, and the clocking of the correlator ASIC 26 resumes. The wake-up counter 36 then transitions to the "stopped" state 60 again. After a prescribed period of time allowing for signal and navigation processing (K FTF counts), the wake up counter 36 is again armed and the process is repeated. Although other realizations of the wake-up counter are clearly possible, it is key that accurate time (to within a few nanoseconds of error) is kept track of in a power efficient way during the power down cycle.

Returning to FIGS. 2 and 3, when the wake-up counter reaches 0 (at FTF=N+M+K), the hardware is commanded to power on (Step 54). This corresponds to a power down time period of M FTFs (e.g. if M=49 and one FTF is 20 ms, then the hardware has been powered off 980 ms). The navigation solution (PVT) is then updated (Step 56) at the new time step (FTF=N+M+K) by using the system dynamics model (state transition matrix) to transition the PVT solution valid at time step N+K to N+M+K:

$$X(N+M+K) = \Phi \cdot X(N+K), \quad [1]$$

where X is the PVT state vector estimated by the DSP 14 and $\Phi$ is the state transition matrix that models the dynamics of the system.

The size of the allowable time step M depends on the system requirements for the application as well as sensed dynamic and jamming conditions, although 980 ms (M=49) is typical. Once the navigation solution is updated, the cycle then repeats itself (back to Step 44) for as long as the GPS system is in the low power mode.

In order to minimize low power, the variable K takes on the value 1, making the total "on" dwell time 20 ms for the illustrative embodiment. Minimum dwell times of about 20 ms are required to meet navigation requirements in an un-jammed environment. However, due to sensed variations in signal-to-noise power ratio (SNR) conditions (i.e. jamming), platform dynamics, and other practical considerations (i.e. throughput), K may take on values anywhere between 1 and M inclusive. The value of K corresponds to the number of in-phase and quadrature samples that need to be processed during the on part of the low power mode to be described next.

Figure 5:
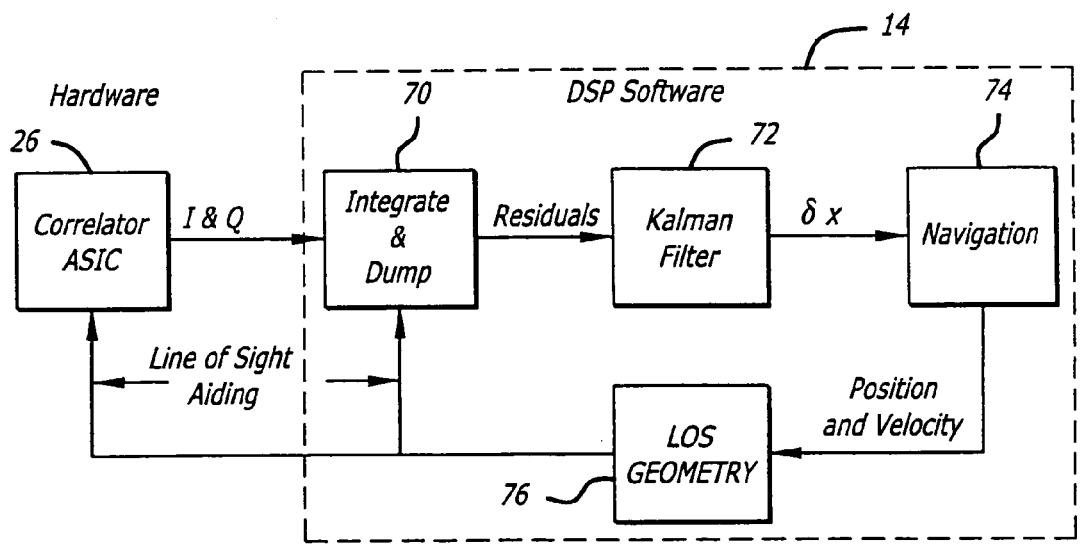
FIG. 5 is simplified block diagram of an illustrative embodiment of a direct measurement processing architecture modified for a low power mode in accordance with the teachings of the present invention.

During the "on cycle" of the low power mode, I and Q sample pairs derived from the GPS signal are collected and processed (at Step 44) using a DMP (direct measurement processing) tracking technique similar to that described in the above referenced patent. FIG. 5 is simplified block diagram of an illustrative embodiment of a DMP architecture modified for a low power mode in accordance with the teachings of the present invention. The correlator ASIC 26 outputs I and Q data pairs to the DSP 14. The DSP software is adapted to calculate range and range-rate residuals directly formed from the I and Q data pairs using integrate and dump techniques (i.e. no tracking loops). In the illustrative embodiment, the DSP 14 includes an integrate and dump function 70 for calculating the residuals, a Kalman filter 72 for generating correction data from the residuals, and a navigation function 74 for calculating the navigation solution (PVT). As discussed above, after the navigation solution is computed, non-essential hardware is commanded to power down.

In the preferred embodiment, the DSP software also includes a line-of-sight (LOS) geometry function 76, which, after the off period, propagates the navigation solution (using Eqn. 1) to the current time (at FTF=N+K+M). The propagated solution is then used to compute LOS aiding, which is fed back to the correlator ASIC 26 and the integrate and dump function 72 for each satellite tracked. The LOS aiding stabilizes receiver tracking errors during the subsequent "power on" dwell period lasting K FTF counts.

Figure 6:
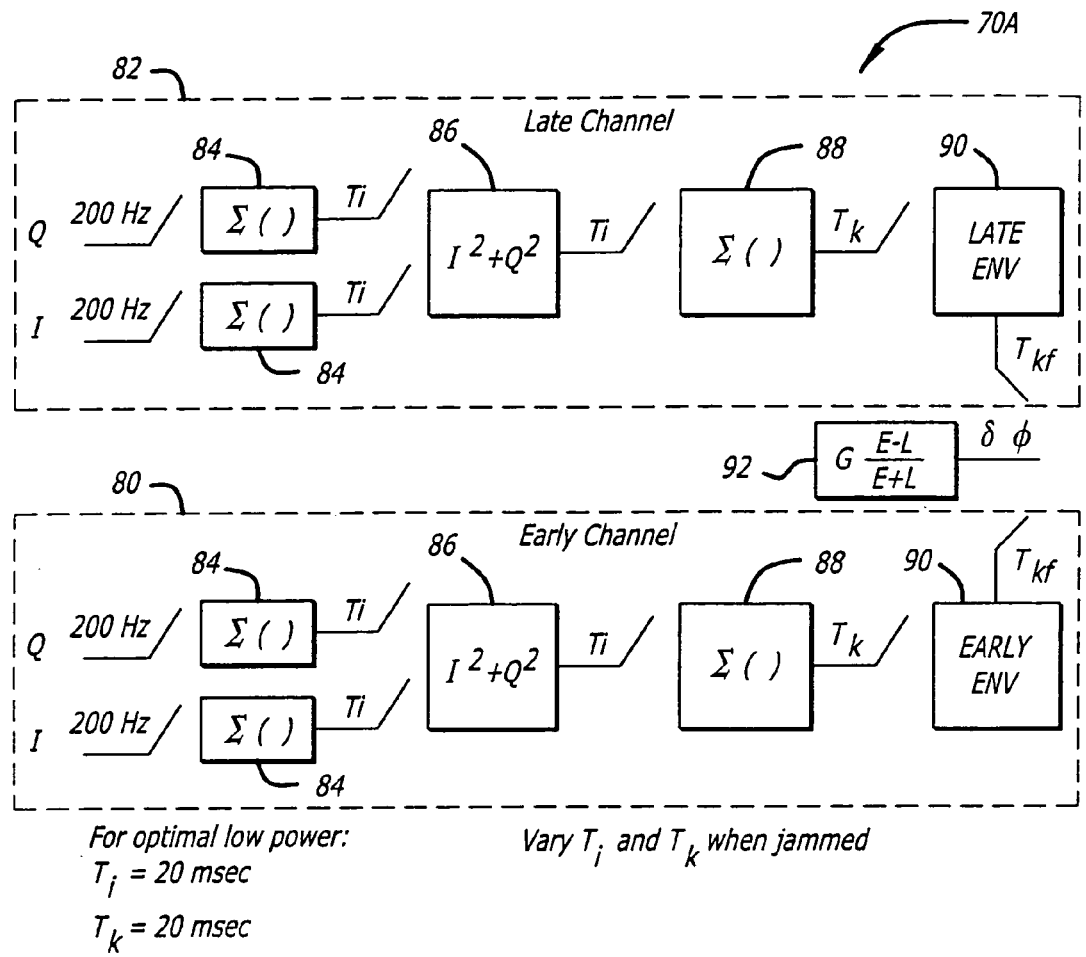
FIG. 6 is a simplified block diagram of an illustrative signal processing algorithm for computing range residuals in accordance with the teachings of the present invention.

FIG. 6 is a simplified block diagram of an illustrative signal processing (integrate and dump) algorithm 70A for computing range residuals in accordance with the teachings of the present invention. The I and Q signals from the correlator ASIC 26 are received at a predetermined rate, this rate being shown as 200 Hz in the illustrative embodiment. The I and Q data are processed using integrate and dump techniques to form range residuals without the use of classical delay lock tracking loops. Both coherent and non-coherent integration processing are illustrated with programmable times, denoted as $T_i$ and $T_k$, respectively. Calculations are made over an early channel 80 and a late channel 82 (separated by +/− one-half chip). In each channel, a summing function 84 coherently adds up each of the I and Q samples individually over a designated time frame $T_i$ to provide summations $$\bar{I} = \sum_{i=1}^{N} I_i \text{ and } \bar{Q} = \sum_{i=1}^{N} Q_i,$$

where N is the number of samples in the time period $T_i$.

At Step 86, for each channel, the I and Q sums are squared (this being a non-coherent type of operation) and summed for the time period $T_i$. The result is then summed over a second time frame $T_k$ (Step 88), followed by envelope detection (Step 90) for each channel, resulting in an early channel output E and a late channel output L given by:

$$E = \left( \sum_{i=1}^{k} (\bar{I}_E^2 + \bar{Q}_E^2)_i \right)^{1/2} \quad [2]$$

$$L = \left( \sum_{i=1}^{k(} (\bar{I}_L^2 + \bar{Q}_L^2)_i \right)^{1/2} \quad [3]$$

where k is the number of samples in the time period $T_k$. The range residual $\delta\phi$ is then computed (Step 92) as the difference between the early channel and late channel outputs divided by the sum of the early channel and late channel outputs:

$$\delta\phi = G\left(\frac{E-L}{E+L}\right), \quad [4]$$

where G is a gain factor.

Figure 7:
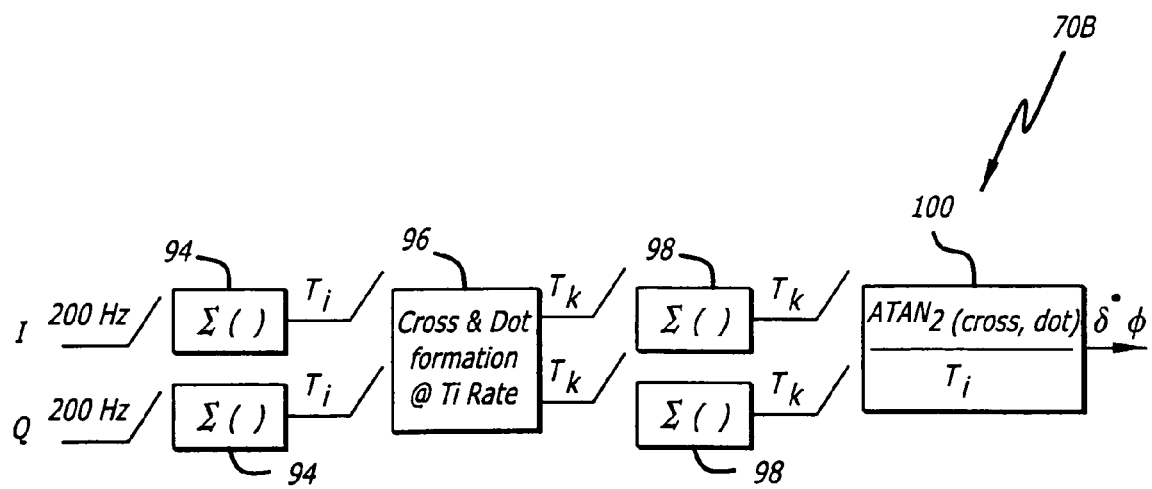
FIG. 7 is a simplified block diagram of an illustrative signal processing algorithm for computing range-rate residuals in accordance with the teachings of the present invention.

FIG. 7 is a block diagram of an illustrative signal processing (integrate and dump) algorithm 70B for computing range-rate residuals in accordance with the teachings of the present invention. First, a summing function 94 coherently adds up each of the I and Q samples individually over a designated time frame $T_i$ to provide summations for each of the I and Q signals. From these summations, cross and dot products are formed (Step 96) at the $T_i$. rate, and the cross and dot products are then each summed (Step 98) over a different time interval of length $T_k$ to provide a pair of second summations, one for the cross product signal and one for the dot product signal:

$$\text{cross} = \sum_{i=1}^{k} (\overline{Q}_n \overline{I}_{n-1} - \overline{I}_n \overline{Q}_{n-1})_i \quad [5]$$

$$\text{dot} = \sum_{i=1}^{k} (\overline{I}_n \overline{I}_{n-1} + \overline{Q}_n \overline{Q}_{n-1})_i \quad [6]$$

The range-rate residual $\delta\dot{\phi}$ is then computed (Step 100) by applying an arctangent function to the summed cross products and dot products, and dividing the result by the integration time ($T_i$):

$$\delta\dot{\phi} = [\arctan 2(\text{cross}, \text{dot})]/T_i \quad [7]$$

Note that to optimize for low power in an un-jammed environment (with K=1), $T_i$ and $T_k$ are equal to one FTF (20 ms) for forming range residuals. Similarly, coherent and non-coherent times of ½ FTF (10 ms) and one FTF (20 ms) for $T_i$ and $T_k$ are required to optimize for low power when forming range-rate residuals. In fact, when the nominal SNR is large enough, it is possible to make the time on period less than 20 ms. When jamming occurs, both the coherent and non-coherent times ($T_i$ and $T_k$) can be adjusted upward to boost the SNR prior to forming residuals, running the Kalman filter, and correcting the navigation solution. In the preferred embodiment, the integration times, and hence the value of the variable K, are adapted to find the proper balance between SNR, sensed platform dynamics, and low power requirements.

Another embodiment of the basic tracking concept exploits a feature of the ESPC that permits a subset of selected ESPC channels to remain on during the "power off" cycle in order to collect and store a continuous block of I and Q samples to be processed during the subsequent "power on" part of the cycle. This has the advantage of boosting the SNR when jammed with only a small power dissipation penalty since only a few selected channels remain on. This embodiment can also make use of data cancellation techniques known as data wipe-off (DWO) to further enhance SNR conditions when in the low power mode. In addition, this particular embodiment enables the non-coherent demodulation of satellite data during the on part of the cycle. Demodulation of satellite data while in the low power mode significantly stretches the duration of the time the system can stay in the low power mode, thus further extending battery life.

Note that with future enhancements other embodiments will emerge in order to extend the dynamic range of error discriminators used as part of the residual formation process (i.e., enhancements to the signal processing in FIGS. 5–7). Extended dynamic range translates to extending tracking SNR thresholds using very low update rates under handheld dynamic conditions (i.e. large M), further minimizing power dissipation. These techniques include the extension of range residual estimation beyond the early and late correlator structure implied in FIG. 6 and makes use of all available correlators for each channel during the on part of the cycle. The ESPC has 32 correlators that may be used for such processing during each on cycle, covering a dynamic range of 480 meters (two-sided). Similarly, FFT (Fast Fourier Transform) processing techniques on each correlator will emerge in conjunction with data cancellation techniques to extend the dynamic range for range rate residuals (e.g., velocity error ranges of 20 m/s two-sided are realistic).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system comprising:
a circuit including a processor adapted to collect samples of a GPS signal for a first predetermined length of time and in accordance therewith generate an output signal including a navigation solution, said processor, or portions thereof, being adapted to power on and off during said first and second predetermined lengths of time respectively; said processor being adapted to calculate said navigation solution from said samples using an integrate and dump technique, and
first means for cyclically powering on said circuit for said first predetermined length of time and powering off said circuit, or a portion thereof, for a second predetermined length of time.

2. The invention of claim 1 wherein said processor is adapted to calculate range and range rate residuals directly from said samples collected during said first predetermined length of time.

3. The invention of claim 2 wherein said processor includes a Kalman filter for calculating correction data from said range and range rate residuals.

4. The invention of claim 3 wherein said processor further includes a navigation function for calculating a navigation solution from said correction data.

5. The invention of claim 4 wherein said processor is further adapted to propagate said navigation solution to an updated time after being powered on after said second predetermined length of time.

6. The invention of claim 5 wherein said processor is further adapted to calculate a line of sight aiding from the propagated navigation solution.

7. The invention of claim 1 wherein said processor is a digital signal processor.

8. The invention of claim 1 wherein said circuit further includes a receiver adapted to collect samples of said GPS signal.

9. The invention of claim 8 wherein said receiver includes an RF front end adapted to receive said GPS signal and output intermediate frequency samples.

10. The invention of claim 9 wherein said RF front end, or portions thereof, are adapted to power on and off during said first and second predetermined lengths of time, respectively.

11. The invention of claim 9 wherein said receiver further includes a GPS correlator ASIC adapted to receive said intermediate frequency signals and output GPS data samples to said processor.

12. The invention of claim 11 wherein said GPS correlator ASIC, or portions thereof, are adapted to power on and off during said first and second predetermined lengths of time, respectively.

13. The invention of claim 12 wherein selected channels of said GPS correlator ASIC are adapted to remain on during said second predetermined length of time to continue collecting GPS data.

14. The invention of claim 1 wherein said first means includes a counter adapted to count time during said second predetermined length of time.

15. The invention of claim 14 wherein said processor is adapted to arm said counter to begin counting prior to being powered down.

16. The invention of claim 15 wherein said counter is adapted to issue a power on command to said circuit after counting for said second predetermined length of time.

17. The invention of claim 14 wherein said system further includes an oscillator for driving said counter.

18. The invention of claim 1 wherein said first means is implemented using a general purpose logic circuit.

19. The invention of claim 1 wherein said first and second predetermined lengths of time are variable depending on environmental conditions.

20. The invention of claim 1 wherein said first predetermined length of time is approximately 20 msec.

21. The invention of claim 1 wherein said second predetermined length of time is approximately 1 sec.

22. A GPS tracking system comprising:
a receiver adapted to collect GPS data samples during an on phase;
a processor adapted to process said GPS data during said on phase using an integrate and dump algorithm; and
a mechanism for cyclically powering down said receiver and/or processor, or portions thereof, during an off phase and powering on said receiver and/or processor, or portions thereof, during said on phase.

23. A method for reducing power dissipation in a GPS tracking system including the steps of:
collecting GPS data samples during an on phase;
processing said GPS data during said on phase using an integrate and dump algorithm; and
cyclically powering down said receiver and/or processor, or portions thereof, during an off phase and powering on said receiver and/or processor, or portions thereof, during said on phase.

* * * * *